United States Patent [19]

Pulley et al.

[11] Patent Number: 5,147,063
[45] Date of Patent: Sep. 15, 1992

[54] TITANIUM ALUMINIDE STRUCTURE

[75] Inventors: John K. Pulley, Huntington Beach; George W. Stacher, Westminster, both of Calif.

[73] Assignee: Rockwell International Corporation, Seal Beach, Calif.

[21] Appl. No.: 650,159

[22] Filed: Feb. 4, 1991

[51] Int. Cl.⁵ .................. B65D 25/14; F17C 1/00; B32B 15/00
[52] U.S. Cl. .................. 220/454; 220/901; 428/660
[58] Field of Search .......... 428/660, 651, 598; 220/454, 901, 445

[56] References Cited

U.S. PATENT DOCUMENTS

| | | | |
|---|---|---|---|
| 3,565,275 | 2/1971 | Vto | 220/901 |
| 3,941,272 | 3/1976 | McLaughlin | 220/901 |
| 4,875,361 | 10/1989 | Sharp | 220/445 |
| 4,966,816 | 10/1990 | Wardlaw et al. | 428/660 |
| 5,015,305 | 5/1991 | Froes et al. | 148/20.3 |

*Primary Examiner*—John Zimmerman
*Attorney, Agent, or Firm*—Terrell P. Lewis; Charles T. Silberberg

[57] ABSTRACT

The invention resides in the fabrication of a structural element comprising a laminated composite having one portion or layer comprising alpha-phase titanium aluminide and another adjacent portion or layer comprising gamma-phase titanium aluminide. Preferably, the gamma-phase portion or layer is joined with the alpha-phase portion or layer by such processes as hot-spraying, diffusion bonding, or vapor deposition. The invention contemplates the utilization of the structural element in the fabrication of the wall of a container or tank for storage of the hydrogen fuel material, where the gamma-phase titanium aluminide portion or layer is oriented so as to be placed in direct contact with the hydrogen fuel material, or at the least be oriented toward any hydrogen leak path.

19 Claims, 1 Drawing Sheet

TITANIUM ALUMINIDE STRUCTURE

BACKGROUND OF THE INVENTION

1. Field of the Invention

The present invention relates to titanium aluminide structures, and more particularly to alpha titanium aluminide structure having a coating of gamma titanium aluminide acting as a barrier against mechanical property degradation when exposed to a hydrogen environment.

2. Background of the Invention

The value of hydrogen as a propellant for rocket motors has been known for many years, and such fuel materials have been widely used in a variety of military, commercial and space projects.

Generally, hydrogen fuel materials are contained as a liquid combustible in storage tanks carried on or within the particular vehicle of interest. Most fuel tanks are embodied as one or more containers housed within the vehicle. Some of these tank arrangements have even evolved into integral systems where the thin wall of the tank is the skin of the vehicle itself. The materials from which the storage tanks are fashioned must be fabricated from materials of a strength great enough to withstand the significantly high gas pressures from within.

In recent years, various titanium alloys have been used to fulfill these needs because of their high strength, elastic modulus, fracture toughness, resistance to creep and low density, as compared to other materials. Of particular interest have been titanium aluminide intermetallic alloys, most notably the alpha-phase titanium aluminides and the gamma phase titanium aluminides. The alpha-phase titanium aluminide alloys have generally been used for the fabrication of hydrogen fuel storage containers. However, it has been found that alpha-titanium aluminide absorbs hydrogen which, in turn, degrades the mechanical properties of this material.

OBJECTS AND SUMMARY OF THE INVENTION

It is therefore an object of the present invention to provide a novel titanium alloy structure which will deter hydrogen degradation of the alloy material's mechanical properties, and at the same time overcome all the deficiencies and disadvantages of the known titanium alloy materials.

Another object of the present invention is to provide a tank or container for storing hydrogen fuel materials, where the tank is fabricated from a material which possesses the same highly desirable structural and mechanical characteristics as known titanium alloy materials while at the same time thwarting degradation of these material properties ordinarily occasioned by the absorption of hydrogen.

Still another object of the present invention is to provide a methodology for fabricating the novel titanium alloy structure of the invention.

These and other objects are accomplished through the application of the surprising results discovered by the present inventors that gamma titanium aluminide doesn't absorb hydrogen, and when provided as a barrier layer for alpha-phase titanium aluminide disposed between the latter and the hydrogen environment, the gamma-phase titanium aluminide layer protects the alpha-phase titanium aluminide layer against the undesirable degradation of mechanical properties discussed above.

In accordance with the principles of the present invention, these objects are accomplished by the fabrication of a structural element comprising a laminated composite having one portion or layer comprising an alpha-phase titanium aluminide and another adjacent portion or layer comprising a gamma-phase titanium aluminide. Preferably, the gamma-phase portion or layer is joined with the alpha-phase portion or layer by such processes as hot-spraying, diffusion bonding, or vapor deposition. In fabricating a container or tank for storage of the hydrogen fuel material, the structural element may be utilized in the construction of the container or tank wall with the gamma-phase titanium aluminide portion or layer being oriented so as to be placed in direct contact with the hydrogen fuel material, or at the least be oriented toward any hydrogen leak path.

DETAILED DESCRIPTION OF THE INVENTION

Figure 1:
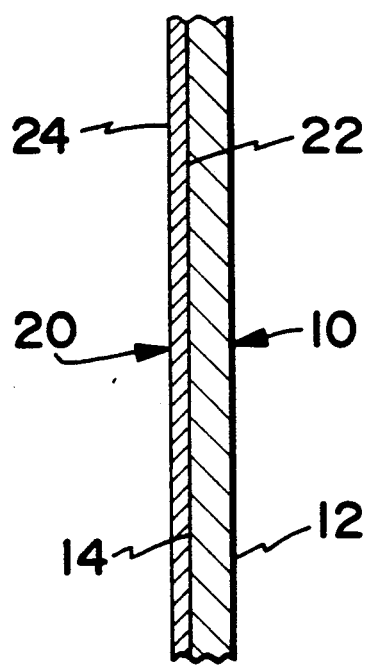
FIG. 1 illustrates a first configuration of wall construction contemplated by the present invention.

Referring now to FIG. 1, the wall construction depicted comprises a first sheet-like layer 10 and a second covering layer 20. As contemplated by the present invention, the first layer 10 is fabricated from alpha-phase titanium aluminide material, while the second layer 20 is fabricated from gamma-phase titanium aluminide material. The thickness of the first layer 10 is significantly greater than the thickness of the second layer 20. Indeed the thickness of the second layer, preferably on the order of about 0.005 inches or less, may even be compared with a thin coating, film or foil applied in a manner to be described below.

Figure 2:
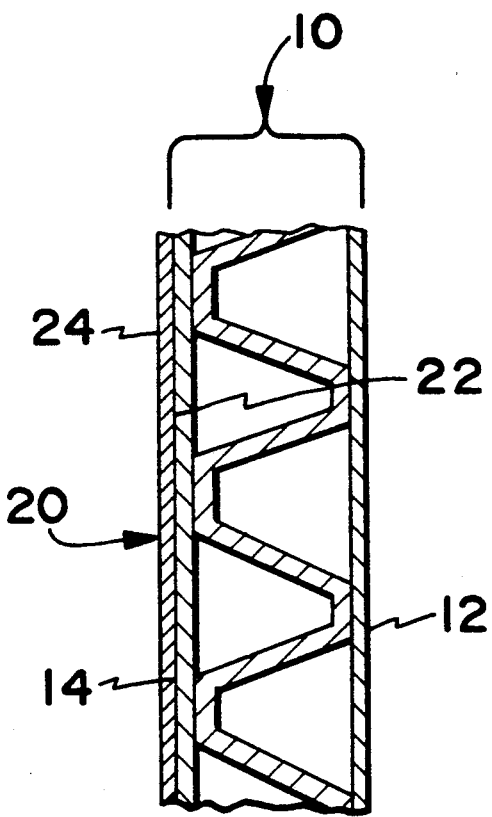
FIG. 2 illustrates a second configuration of wall construction contemplated by the present invention.

FIG. 2 shows the first layer 10 of the wall construction being formed as a truss-like structural member. Again as with the configuration shown in FIG. 1, the cumulative thickness of all constituents of the first layer is significantly greater than the cumulative thickness of the second layer. The second layer possesses the appearance of a thin coating, film or foil applied in the manner described below.

As shown in both FIGS. 1 and 2, the first layer of the wall construction has a first surface 12 exposed to the ambient and a second parallel surface 14 in direct contact with a first surface 22 of the second layer of the wall construction. A second surface 24 of the second layer of wall construction is disposed in such a manner as to form the interior surface of the container or tank. In one embodiment contemplated by the present invention, the second surface of the second layer is placed in direct contact with the hydrogen fuel materials. In another embodiment it is envisioned that a sealing or insulating layer would be placed between the second surface of the second layer and the hydrogen fuel material environment. In this instance then, the second layer provides a desired degree of protection against any hydrogen fuel leaks.

The present invention contemplates the application of the second gamma-phase titanium aluminide layer to the first alpha-phase titanium aluminide layer by means of a variety of processes, including plasma-arc spraying, diffusion bonding, and vapor depositing.

For plasma spraying, RSR gamma alloy powder would be employed using currently available plasma spray equipment and procedures. The hot gamma alloy would be sprayed (in liquidus phase) in a vacuum chamber under controlled temperature conditions. The resulting thickness would be controlled to prevent hydrogen diffusion.

For diffusion bonding, gamma foil would be used. Standard pressure, time and temperature parameters and controls would be employed. Diffusion bonding pressure could be applied via hydraulic press pressure, gas pressure or roll bonding, either singly or in packs. In all stages of the process, inspection would be required to assure adequacy of thickness of the applied gamma-phase titanium aluminide hydrogen barrier layer.

The present invention contemplates the use of the novel wall construction described hereinabove in structures where there would be contact with hydrogen, as for example in hypersonic aerospace vehicles, new space shuttle type vehicles, or new military or commercial vehicles.

The procedures of coating titanium aluminide materials and other modifications and variations of the invention will be readily apparent to those skilled in the art in the light of the above teachings. Although the aspects of the invention discussed herein purport to be related to titanium aluminide materials, the invention is not so limited. Other materials and alloys that are subject to property changes due to environmental hydrogen exposure may be provided with barrier coatings according to the teachings and within the scope of the present invention. Thus, within the scope of the appended claims, the invention may be practiced other than as specifically described herein.

We claim:

1. A wall construction for use in fabricating storage containers for hydrogen fuel materials, comprising:
    a first layer of alpha-phase titanium aluminide material,
    a second layer of gamma-phase titanium aluminide material disposed adjacent and secured to one surface of said first layer,
    a portion of said second layer being exposed for direct contact with said hydrogen fuel materials.

2. The wall construction of claim 1, wherein said second layer is applied to said first layer when in said liquidus phase.

3. The wall construction of claim 1, wherein said second layer is applied to said first layer by a process of plasma arc spraying.

4. The wall construction of claim 1, wherein said second layer is applied to said first layer by a process of diffusion bonding.

5. The wall construction of claim 1, wherein said second layer is applied to said first layer by a vapor deposition process.

6. The wall construction of claim 1, wherein said second layer has a thickness substantially less than the thickness of said first layer.

7. The wall construction of claim 6, wherein said second layer has a thickness of 0.005 inches or less.

8. The wall construction of claim 1, wherein said first layer comprises a sandwich configuration including at least one truss-like reinforcing member.

9. A storage container for hydrogen fuel materials, comprising an outer wall of titanium aluminide material fashioned into a predetermined hydrogen fuel containing shape, and an inner wall of titanium aluminide material covering said outer wall and being exposed to the hydrogen fuel materials within said container, said inner wall being formed of a gamma-phase titanium aluminide material.

10. The storage container of claim 9, wherein said inner wall is formed by coating one surface of said outer wall prior to forming said outer wall into said container.

11. The storage container of claim 10 wherein said coating is provided by a plasma spray process.

12. The storage container of claim 10, wherein said coating is provided by a diffusion bonding process.

13. The storage container of claim 10, wherein said coating is provided by a vapor depositing process.

14. The storage container of claim 10, wherein said coating has a thickness of no more than approximately 0.005 inches.

15. A barrier layer for titanium alloy fashioned into a container for storage of hydrogen materials, comprising:
    gamma-phase titanium aluminide material, said gamma-phase material being provided on the interior surfaces of said container.

16. The barrier layer of claim 15, wherein said gamma-phase material is applied to said interior surfaces prior to fashioning of said titanium alloy into the container.

17. The barrier layer of claim 16, wherein said gamma-phase material is applied via a diffusion bonding process.

18. The barrier layer of claim 16, wherein said gamma-phase material is applied via a plasma spray process.

19. The barrier layer of claim 16, wherein said gamma-phase material is applied as a coating having a thickness of no more than 0.005 inches.

* * * * *